UNITED STATES PATENT OFFICE.

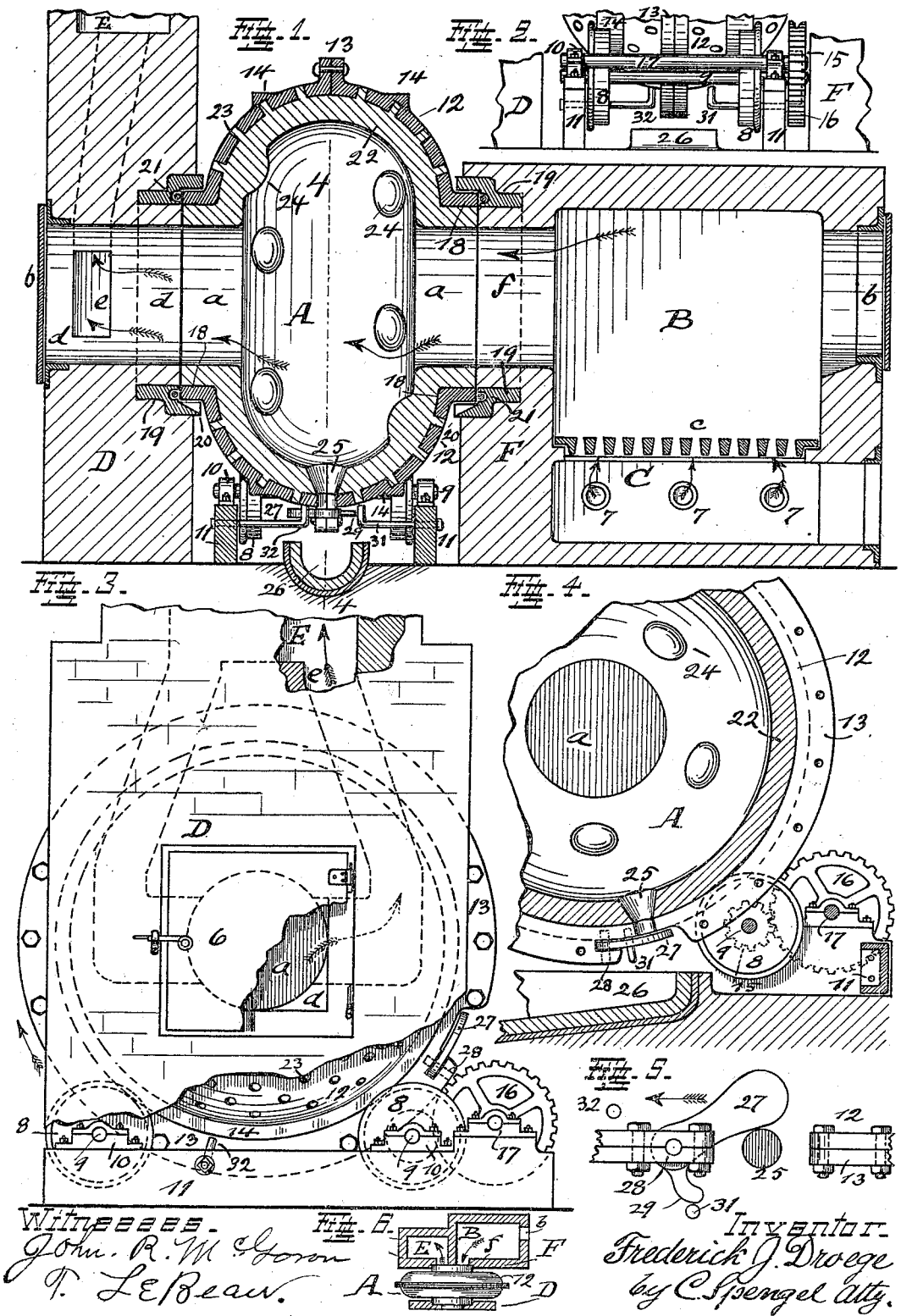

FREDERICK J. DROEGE, OF COVINGTON, KENTUCKY.

HEATING-FURNACE.

960,517.

Specification of Letters Patent. Patented June 7, 1910.

Application filed September 4, 1909. Serial No. 516,248.

*To all whom it may concern:*

Be it known that I, FREDERICK J. DROEGE, a citizen of the United States, and residing at Covington, Kenton county, State of Kentucky, have invented certain new and useful Improvements in Heating-Furnaces; and I do declare the following to be a clear, full, and exact description thereof, attention being called to the accompanying drawing, with the reference characters marked thereon, which forms also a part of this specification.

This invention relates to improvements in the construction of metallurgical furnaces of the reverberatory type and in which a charge of material, which may be ore, metal, scrap etc. or a mixture of substances, is agitated under the influence of heat to effect necessary chemical alterations, to refine and to clear it of slag, dross and impurities, and to cause it thereafter to assume a suitable condition to prepare it for succeeding steps necessary to obtain a finished product, wrought-iron for instance.

The invention consists of a furnace constructed in the particular manner as described and as shown and which permits first agitation of the charge and manipulation of it to effect chemical changes necessary for the purpose and separation of impurities, after which the charge is caused to collect and to assume the form of a lump of desired compactness to facilitate its handling during succeeding manufacturing steps.

In the following specification and particularly pointed out in the claims at the end thereof, will be found a full description of my invention, together with its operation, parts and construction, which latter is also illustrated in the accompanying drawing, in which:—

Figure 1, is a vertical, longitudinal section through the center of the furnace. Fig. 2, shows a portion of the lower part of Fig. 1, in side view. Fig. 3, is a front-view of the furnace with parts broken away. Fig. 4, is part of a vertical transverse section taken on line 4—4 of Fig. 1. Fig. 5, illustrates an operation for automatically controlling an outlet-opening. Fig. 6, is a horizontal section at reduced scale and shows a modified arrangement by which the heat is passed through the furnace.

The furnace consists of the heater A in which the charge is manipulated while under the influence of heat derived from a fire-box B, of which $b$ is the feed-door, C the ash-pit and $c$ the grate. The heater is in shape of a drum having a concave annular side and opposite flat sides, each of which latter has an opening $a$ in its center, which openings are alined with each other and concentric with the axis of the drum. This latter occupies the space between a wall D, which supports a stack E, and a wall F which is the rear-wall of the fire-box.

$d$ is an opening in wall D controlled by a door 6, and $f$ is another opening in wall F, both openings being in line with each other and with the openings in the side-walls of the heater.

$e\ e$ are flues starting within opening $d$, one on each side thereof and leading upwardly therefrom into the stack.

The charge is introduced into drum A through openings $d$—$a$ and therein subjected to the action of heat which is generated in fire-box B and traverses the drum, entering the same through openings $f$—$a$ and leaving it through openings $a$—$d$. Smoke and products of combustion pass off through flues $e$—$e$, and out through stack E, door 6 being closed at the time opening $d$ forming now a part of the smoke-outlet.

7—7 are outlets of air-blast pipes to force the heat in the desired direction.

The charge contained in the drum may be agitated for several purposes, one for instance being to obtain the liberation therefrom of impurities and to cause their concentration into a residue, slag, or dross, which may be readily run off. Another purpose may be, as in the case of the manufacture of wrought-iron, to promote decarbonization to effect the chemical changes necessary in the process to convert the charge. Also, in the latter case, the compacting of the mass into a lump of suitable consistency to facilitate its withdrawal from the drum through opening $a$—$d$ and its further manipulation thereafter. This agitation of the charge is obtained by rotation of the drum about its axis. For such purpose the drum is supported on flanged rollers 8, which are arranged in two sets, mounted upon axles 9 and supported in boxes 10 on a frame 11.

The drum consists of an interiorly lined shell 12, preferably made in two sections, each of which has a flange 13 whereby they are bolted together to form the shell. Two spaced annular rims 14 are provided around the convex outside of the shell which form circumferential treads whereby the drum is supported upon rollers 8, and held between the flanges thereof, there being one set of rollers on each side of the center of the drum, and two rollers under each tread. Motion is imparted by positively rotating one set of the rollers which causes the drum to follow by reason of frictional contact. For such purpose the axle of the driven set is extended at one of its ends and a suitable machine-element, preferably a pinion 15, is mounted thereon. The pinion is driven by a gear-wheel 16 mounted upon a shaft 17 also supported upon frame 11. Power may be applied to this gear-wheel in any suitable manner, such as derived from an electric motor being very suitable for the purpose and permits ready control of the operation of the drum as to starting, stopping and speed.

The sides of the shell around the openings in the sides of the drum are extended outwardly to form necks 18, which are fitted into two collars 19, set into walls D and F respectively, they being walled in so as to be protected against the heat. No weight is carried by these collars, the object of the interfitting of the parts being merely to prevent escape of heat and smoke. Abrasions due to wear, also matter which may have entered the space between necks 18 and collars 19 are prevented from accumulating and may work out through notches 20, one of which is provided in the lowest part of each collar. A recess 21 may be provided in one of these parts to receive a suitable packing, asbestos-wick for instance, to render the joint still closer.

The inside of the shell is protected with a heat-resisting lining 22 which may be clay, fire-brick, or other suitable material. This lining extends also into necks 18 of the shell to protect them and meets those portions of walls D and F which surround openings $d$ and $f$ in them, so that the sides of these openings and of the openings in both sides of the drum become continuous as best shown in Fig. 1.

The shell is perforated as shown at 23, which serves to lessen its weight and aids the connection of the lining, the mortar of which may enter these openings and key into them.

To promote the agitation of the charge, the separation of slag therefrom and finally the collection of its parts into a lump, I provide spaced bumpers 24, arranged alternately on opposite sides within the inside of the drum which throw its contents first from one side to the other and finally from the sides of the drum into its lowest part, causing thereby the parts of the charge, scrap for instance in case of a scrap-heating furnace, to ball together and form into a lump. The interior lining is shaped accordingly to produce these projections. At the proper time a lump so formed is removed through opening $a\ d$, by means and devices well known in this art, the rotation of the drum being stopped meanwhile.

25 is an outlet from the drum to permit evacuation of the slag and dross which pass off through a gutter 26. A cut-off 27 pivoted to the shell at 28 controls this outlet. The drum may be stopped, with the outlet-opening above the gutter, whenever the slag is to be let out, the cut-off being pushed open by means of a suitable implement and closed again in same manner. Discharge of this slag as quick as it is formed may also be effected automatically during the rotation of the drum to prevent its accumulation, by causing cut-off 27 to open for a limited period every time the outlet passes above the gutter. A possible way is shown in the drawing, particularly in Fig. 5. An arm 29 is provided on the cut-off and a stationary stop 31 is so located that it extends into the path of this arm whereby, when this latter comes in contact with it, the cut-off is caused to open as shown in Figs. 1 and 5. This causes also the cut-off to move into a position in which it comes in contact with another stop 32 whereby it is closed again. This second stop is so spaced from the first stop as to permit the cut-off to remain open for a little while, causing it to close however before the outlet-opening has passed beyond the gutter. Thus, as will be seen, the outlet opens and closes during every rotation of the drum and is open while passing over the gutter. In details of construction, this outlet with its controlling means and the actuating devices therefor may be varied without departing from the general object aimed to be attained.

Instead of having two lateral flues $e\ e$, one flue may be used which starts from the top of opening $d$ and enters the stack directly. The part of the wall which contains this flue may be movable to facilitate access to the heater for charging and for removing the charge. The stack may also be located as shown in Fig. 6, in which case the heat passes in and out through the same opening in the heater.

Having described my invention, I claim as new:

1. In a heating-furnace of the kind described, the combination of a rotary heater consisting of a lined shell and having axially alined, circular openings in opposite sides with marginal, outwardly projecting necks, a wall on each side of this heater, each of which has an opening, which openings are opposite the openings in the heater, marginal collars seated in these walls and surrounding the openings therein into which the necks of the heater are fitted, there being annular recesses between each of these collars and the necks fitted into them to permit packing, a fire-box in communication with one of these openings and a stack in communication with the other opening.

2. In a heating-furnace of the kind described, the combination of a rotary, drum-shaped heater having openings in its opposite sides and one in its peripheral side, a fire-box in communication with the opening in one side, a stack in communication with the opening in the other side, a pivotally connected cut-off having a laterally extending arm to control the opening in the peripheral side and spaced stops, one located in the path of this arm so as to cause this cut-off to open every time while passing through the lowest portion of its circular path and the other located in the path of the cut-off after it is open and serving to close the same.

3. In a heating-furnace of the kind described, the combination of a rotary heater having axially alined openings in its opposite sides permitting passage of heat, also inwardly extending projections on each side spaced around the openings therein to agitate this charge and to work it from both sides into the lowest part of the heater.

4. In a heating-furnace of the kind described, the combination of a heater having openings permitting passage of heat, said heater consisting of a perforated shell and of an interior, fire-proof lining involving in its application the use of plastic matter, the connection of which is aided by its engagement with the perforations in the shell.

5. In a heating-furnace of the kind described, the combination of a rotary heater consisting of a lined shell and having axially alined, circular openings in opposite sides with marginal, outwardly projecting necks, a wall on each side of this heater, each of which has an opening, which openings are opposite the openings in the heater, marginal collars seated in these walls and surrounding the openings therein into which the necks of the heater are fitted, each of said collars having an outwardly open notch in its lowest part to provide an outlet for abrasions and other matter which may have entered the space between these collars and the necks extending into them, a fire-box in communication with one of these openings and a stack in communication with the other opening.

In testimony whereof, I hereunto affix my signature in the presence of two witnesses.

FREDERICK J. DROEGE.

Witnesses:
C. SPENGEL,
T. LE BEAU.